United States Patent [19]

Sweeney et al.

[11] 4,387,799
[45] Jun. 14, 1983

[54] TAPERED BED FEEDER

[75] Inventors: Raymond G. Sweeney, Little Chute; William L. Rammer, Kaukauna, both of Wis.

[73] Assignee: Badger Northland, Inc., Kaukauna, Wis.

[21] Appl. No.: 273,883

[22] PCT Filed: Jul. 14, 1980

[86] PCT No.: PCT/US80/00906
§ 371 Date: Jul. 14, 1980
§ 102(e) Date: Jul. 14, 1980

[87] PCT Pub. No.: WO82/00283
PCT Pub. Date: Feb. 4, 1982

[51] Int. Cl.³ .............................................. B65G 19/28
[52] U.S. Cl. ................................. 198/735; 119/52 B; 198/861
[58] Field of Search ........................ 119/52 B, 51 CF; 198/735, 861, 841; 222/415; 414/300, 302

[56] References Cited

U.S. PATENT DOCUMENTS

| | | | |
|---|---|---|---|
| 2,632,559 | 3/1953 | Weigel | 198/735 |
| 2,818,164 | 12/1957 | Dommann | 198/735 X |
| 2,837,203 | 6/1958 | Reeser | 198/861 |
| 3,779,368 | 12/1973 | Smith | 198/841 |
| 3,842,805 | 10/1974 | Patz | 119/52 B |

*Primary Examiner*—Jeffrey V. Nase
*Attorney, Agent, or Firm*—King and Liles

[57] ABSTRACT

The object of the invention is to provide a feeder for livestock which is simple and easy to assemble at the site of use and which is compact for shipment. The feeder 10 includes a center section 42, a drive shaft 106 and drive shaft support 44 and an idler shaft 64 and idler shaft support 40. The center section 42 has a plurality of reversible and identical side panel members 150 and 152 formed from flat pieces of sheet metal. Each side panel member 150 or 152 has a tapered bed support ledge 154 and an endless conveyor chain return run support ledge 158. A spacer bracket assembly 166 with two generally vertical side sections 170 has two side panel members 150 or 152 secured to each side section 170. The drive shaft support 44 is attached to one end of the center section 42 and the idler shaft support 40 is attached to the other end of the center section 42. A tapered bed is secured to the tapered bed support ledges. An endless chain 48 with attached conveyor slats 50 is trained around the drive shaft 106 and the idler shaft 64. Each conveyor slat assembly 186 includes an antifriction wear strip 194. A cover 200 snaps over conveyor cover retaining flanges 164.

9 Claims, 9 Drawing Figures

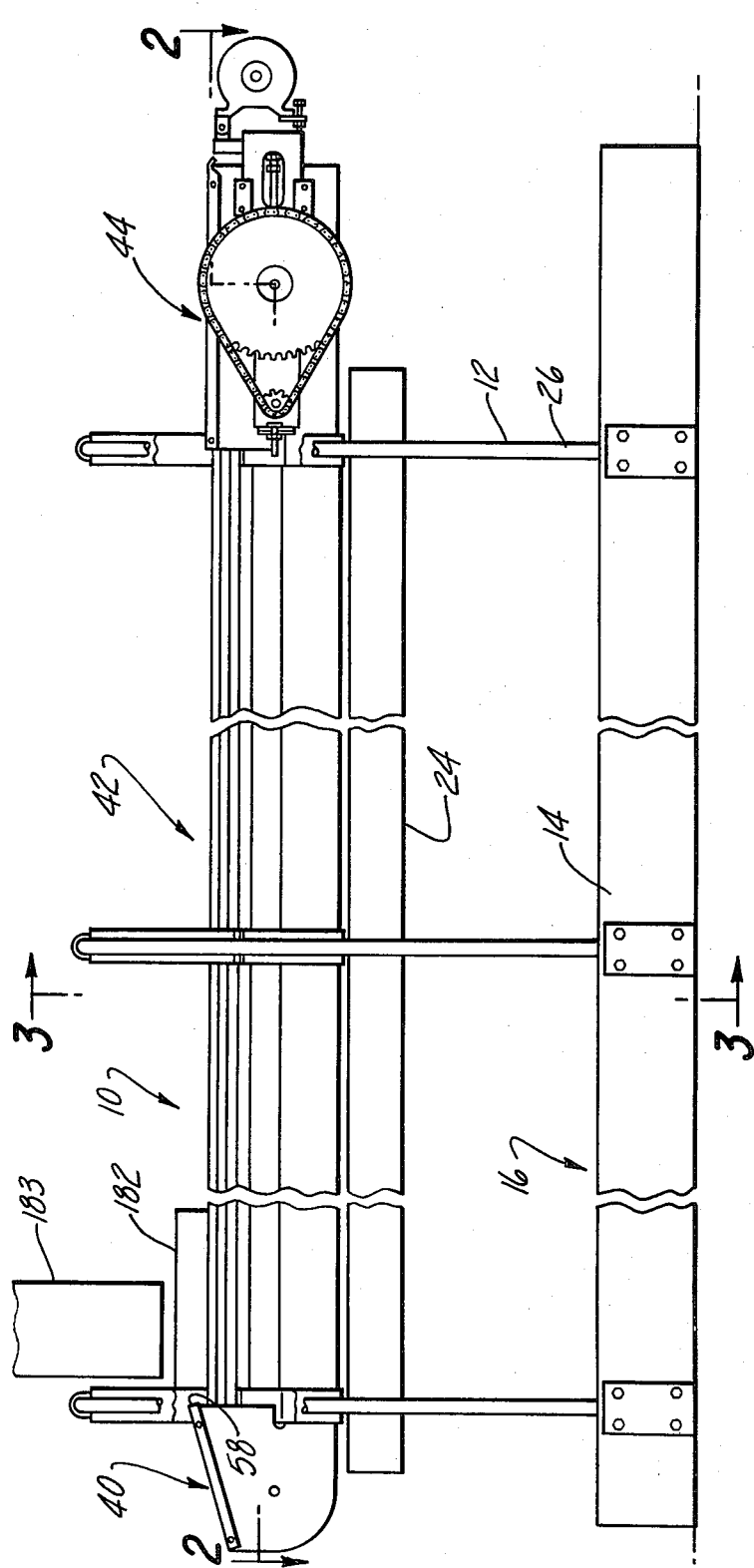

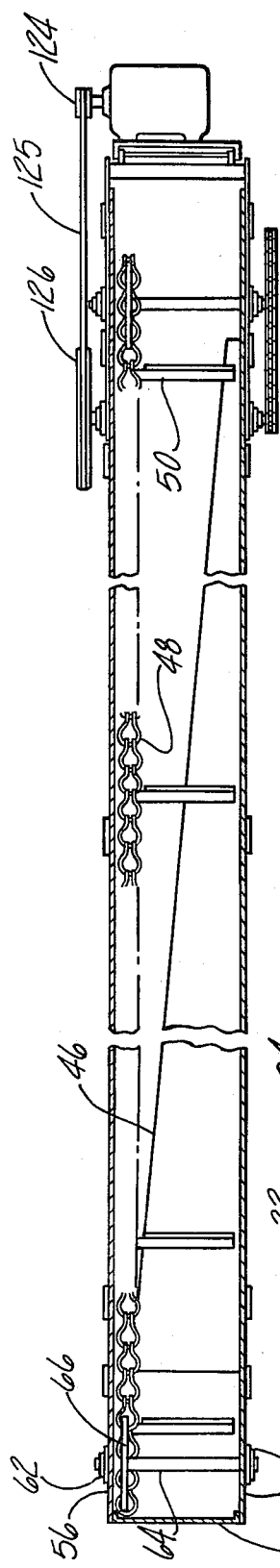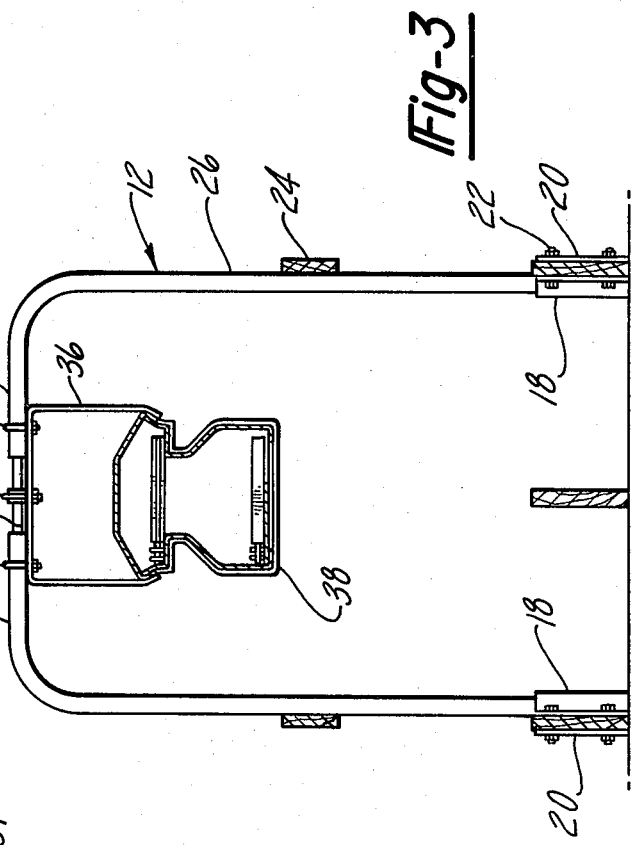

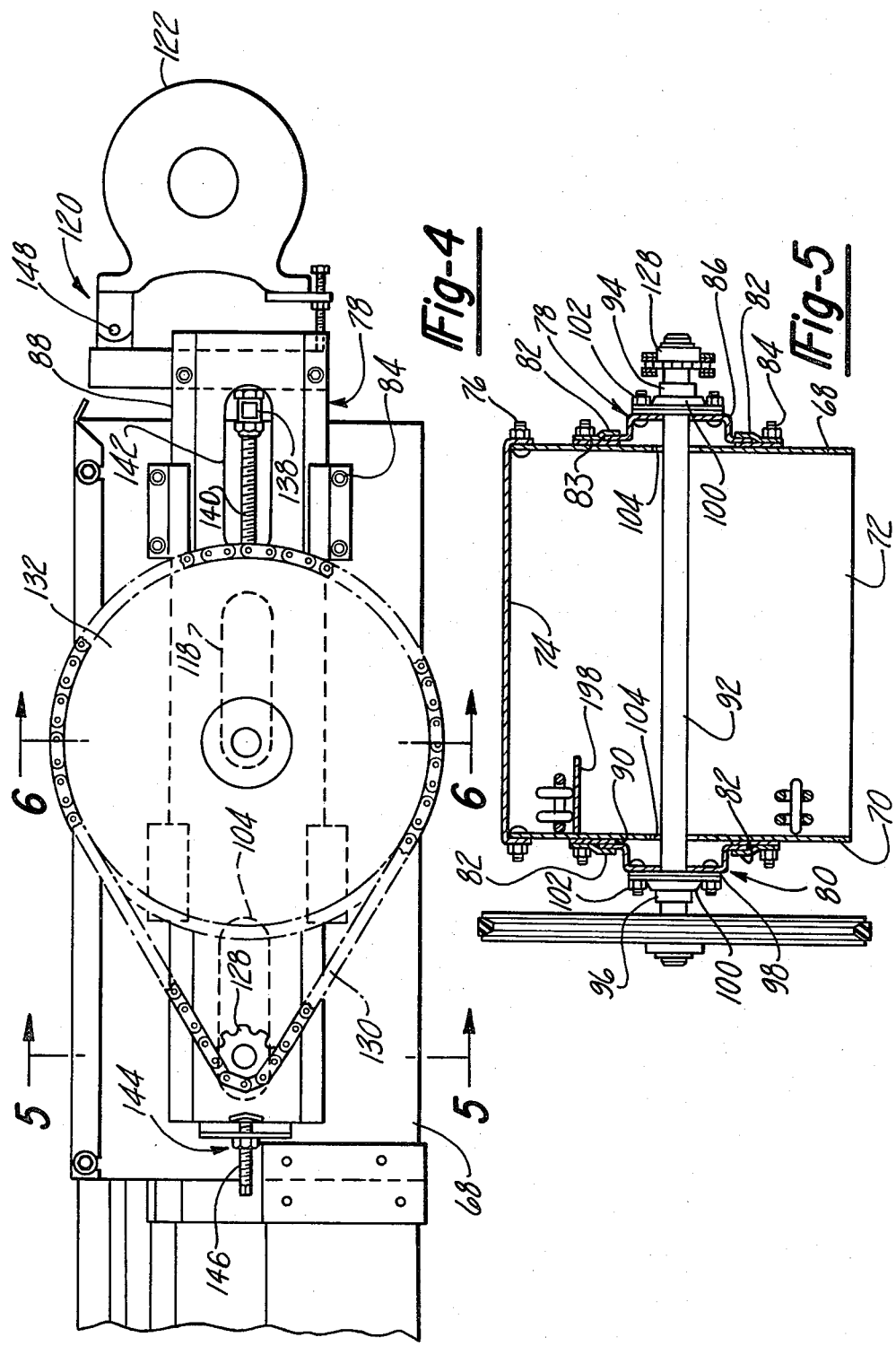

TAPERED BED FEEDER

TECHNICAL FIELD

The invention relates to feeders for distributing feed to livestock. The feeder is mounted above an elongated livestock feed bunk.

In operation, feed is more or less equally dropped from the feeder along the length of the feed bunk or at least a portion of the length of the feed bunk.

Livestock line up on either one or both sides of the feed bunk and get substantially equal portions of the feed from the feeder.

BACKGROUND ART

Tapered bed feeders are well-known in the art. These feeders, with continuous chain and slat conveyors that convey feed along the upper surface of a bed which decreases in width so that feed falls off, have been used comercially for many years. The sides of these feeders, which form the frame, support the tapered bed and provide support for the upper and lower runs of the conveyor chain, are normally constructed from formed sheet metal with angles, channel and other pieces welded or bolted to the sheet metal. Due to the complexity of the construction, sections of these feeders are normally constructed in a factory. The relatively bulky sections are shipped to the farm where they are to be used. The sections are joined end to end above the feed bunk to form a feeder of the desired length.

DISCLOSURE OF INVENTION

The tapered bed feeder conveyor includes a center section; a tapered bed secured to the center section; an idler shaft support, idler shaft and a conveyor sprocket attached to one end of the center section; a drive shaft support, drive shaft and conveyor drive sprocket secured to the other end of the center section; and at least one endless chain trained around the sprockets on the idler shaft and drive shaft with conveyor slats extending from the endless chain. The idler shaft support is fabricated by welding and bolting various metal parts into a single assembly. The drive shaft support is also fabricated by welding and bolting various metal parts into a single assembly. The elongated center section includes at least two reversible and identical side panel members formed from sheet metal with integral tapered bed support ledges and endless chain return support ledges. The side panel members can be nested together for compact storage and shipment. Spacer bracket assemblies are used to connect panel members together in a parallel spaced apart relationship. The spacer bracket assemblies also connect side panel members together in end to end relationship to provide the desired overall length feeder.

The side panel members also include a flange for securing a cover on the feeder without the use of fasteners.

A cover is provided that has lips engageable with the conveyor cover retaining flanges.

Antifriction material is secured to the conveyor slats to reduce friction, wear, and noise and to increase the life of the feeder.

The tapered bed support ledge on each side panel is below the integral endless chain return support ledge.

A center section of the tapered bed feeder includes at least one spacer bracket assembly. The spacer bracket assembly has generally vertical side sections. Two side panel members are secured to each side section of the spacer bracket assembly in an end to end relationship.

BRIEF DESCRIPTION OF DRAWING

FIG. 1 is a side elevation of the tapered bed feeder supported above a feed bunk;

FIG. 2 is a sectional view of the tapered bed feeder taken along lines 2—2 of FIG. 1;

FIG. 3 is a sectional view of the tapered bed feeder taken along lines 3—3 of FIG. 1;

FIG. 4 is an enlarged side elevation of the drive shaft support, the drive shaft, and a conveyor chain drive mounted on one end of the center section;

FIG. 5 is a sectional view of the drive shaft support taken along lines 5—5 of FIG. 4;

BEST MODE FOR CARRYING OUT THE INVENTION

Figure 6:
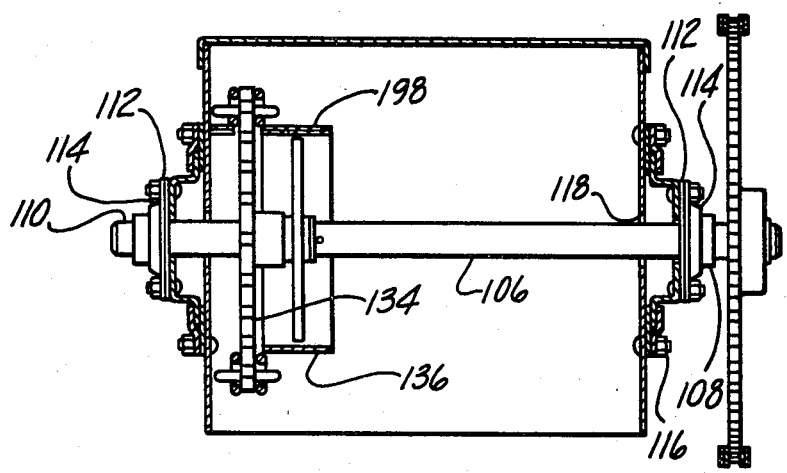
FIG. 6 is a sectional view of the drive shaft support taken along lines 6—6 of FIG. 4.

The tapered bed feeder 10 as shown in FIGS. 1 and 3 is supported by inverted U-shaped supports 12. The inverted U-shaped supports 12 have each lower end secured to sides 14 of the feed bunk 16 by a pair of plates 18 and 20 and four bolts 22. The plates 18 can be welded to the inverted U-shaped supports 12 if desired. Braces 24 are secured to the vertical portions 26 of the inverted U-shaped supports 12. The braces 24 are generally below the tapered bed feeder 10, above the feed bunk 16 and parallel to the feed bunk sides 14. These braces 24 keep animals from climbing into the feed bunk 16, prevent injury to animals by the tapered bed feeder 10 and retain the inverted U-shaped supports 12 to limit their movement relative to the feed bunk 16.

The upper portion of each inverted U-shaped support 12 includes horizontal sections 28 integral with each vertical portion 26 and an adjusting member 30 telescopically received in both horizontal sections 28. The adjusting member 30 allows the width of the inverted U-shaped support 12 to be adjusted to fit most feed bunks 16. The adjusting members 30 are held in position by clamp 32, 34 and 35. These clamps 32, 34 and 35 also connect feeder hangers 36 to the inverted U-shaped supports 12. The lower ends of the feeder hangers 36 are attached to spacer bracket assemblies 38. The spacer bracket assemblies 38 are described in detail below.

The tapered bed feeder 10 as shown in FIGS. 1 and 2 includes an idler shaft support 40, a center section 42, a drive shaft support 44, a tapered bed 46 and an endless chain 48 with attached conveyor seats 50. The idler shaft support 40 as shown in FIG. 2 has an end wall 52 and side walls 54 and 56. A top 58 as shown in FIG. 1 would normally be secured to the top edge of the side walls 54 and 56. Bearing flanges 60 and 62 secure bearings to the side walls 54 and 56 of the idler shaft support 40. An idler shaft 64 is rotatably supported by the bearings secured by the bearing flanges 60 and 62. A conveyor sprocket 66 is secured to the idler shaft 64.

The drive shaft support 44 as shown in FIGS. 4, 5 and 6 includes side walls 68 and 70 and an integral end wall 72. A top wall 74 is secured to the side walls 68 and 70 by bolts 76.

Conveyor adjustment members 78 and 80 are adjustably secured to the side walls 68 and 70 of the drive shaft support 44 by clamping plates 82, spacers 83, and bolts 84. Each conveyor adjustment member 78 and 80 includes a central channel shaped section 86 and integral laterally extending flanges 88. The clamping plates 82 clamp the integral laterally extending flanges 88 to the spacer plates 90 when the bolts 84 are right. The spacer plates 90, which are secured to the side walls 68 and 70 by the bolts 84, hold the integral laterally extending flanges 88 out away from the side walls 68 and 70. Spacers 83 hold the clamping plates 82 away from the spacer plates 90.

A speed reduction shaft 92 is rotatably journaled in bearings 94 and 96. The bearings 94 and 96 are supported by inner and outer bearing holders 98 and 100 that are secured to central channel shaped sections 86 of the conveyor adjustment members 78 and 80 by bolts 102 as shown in FIG. 5. Slots 104 in the side walls 68 and 70 allow adjustment of the speed reduction shaft 92 relative to the integral end wall 72.

A conveyor drive shaft 106 as shown in FIG. 6 is rotatably journaled in bearings 108 and 110. The bearings 108 and 110 are supported by inner and outer bearing holders 112 and 114 that are secured to central channel shaped sections 86 of the conveyor adjustment members 78 and 80 by bolts 116. Slots 118 in the side walls 68 and 70 allow adjustment of the conveyor drive shaft 106 relative to the integral end wall 72.

A motor support and adjustment assembly 120 is secured to the ends of the conveyor adjustment members 78 and 80 which extend beyond the side walls 68 and 70 and the integral end wall 72. A motor 122 is secured to the motor support and adjustment assembly 120.

A drive pulley 124 on the motor 122 drives an endless belt 125 which is trained around a driven pulley 126. The driven pulley 126 is rigidly secured to one end of the speed reduction shaft 92. A drive sprocket 128 is secured to the other end of the speed reduction shaft 92. An endless chain 130 is trained around the drive sprocket 128 and the driven sprocket 132. The drive sprocket 132 is rigidly secured to the conveyor drive shaft 106. A conveyor drive sprocket 134 and a conveyor slat support roller 136 are secured to the conveyor drive shaft 106 between the side walls 68 and 70.

A cross bar 138 is secured to the integral end wall 72 to support a pair of conveyor chain adjustment bolts 140. Slots 142 in the central channel shaped sections 86 of conveyor adjustment members 78 and 80 provide for movement of the adjustment members 78 and 80. To adjust endless conveyor chain 48, conveyor chain adjustment bolts 140 are turned to move the conveyor drive shaft 106 to the proper position.

The endless chain 130 can be adjusted by an adjustment assembly 144 which moves the speed reduction shaft 92 relative to the conveyor adjustments 78 and 80. The endless belt 125 is adjusted by turning the adjustment screw 146 shown in FIG. 4. The adjustment screw 146 pivots the motor 122 about the axis of pin 148. Since the speed reduction shaft 92, the conveyor drive shaft 106 and the motor 122 are all mounted on the conveyor adjustment members 78 and 80 the position of the conveyor drive shaft 106 can be changed without adjusting the endless chain 130 or the endless belt 125.

The center section 42 of the tapered bed feeder 10 is constructed from side panel members 150 and 152. These side panel members 150 and 152 are all identical except that they are made in various lengths so that they can be assembled to make conveyors with various overall lengths. Each side panel member 150 and 152 has a horizontal taper bed support ledge 154. The horizontal tapered bed support ledge 154 is integral with a generally vertical wall section 156. The horizontal endless conveyor chain return run support ledge 158 has its inner side connected to the generally vertical wall section 156 by an integral transition section 160. The integral transition section 160 slopes upwardly and inwardly from the generally vertical wall section 156 to an upper portion 162 which is generally vertical. The generally vertical section 162 ends at the inner edge of the endless conveyor chain return run support ledge 158. A conveyor cover retaining flange 164 extends generally upwardly and outwardly from the outer edge of the endless conveyor chain return run support ledge 158.

The side panel members 150 and 152 are formed from flat pieces of sheet metal that are bent along lines running their length to have the shape described above. The side panel members 150 and 152 can be nested together when one of them is turned end for end as can be envisioned by viewing the shape of the panel members in FIG. 7. By nesting a number of these panels together, a large conveyor can be shipped in a relatively small space and the possibility of damage in shipment is substantially reduced. The nesting of these panels is facilitated by the transition section 160 disposed intermediate the upper and lower ends of the side panels. As is apparent from FIG. 7, when one of the side panels 150 or 152 is turned end to end and nested with the other for transportation to a working site, the corresponding upper and lower edges on adjacent nested panels are both vertically and horizontally offset from each other.

The side panel members 150 and 152 are attached together by spacer bracket assemblies 166. Each of these spacer bracket assemblies includes a generally horizontal bottom section 168 generally vertical side sections 170 extending upwardly from the ends of the generally horizontal bottom section 168, upwardly and inwardly extending transition sections 172 and outwardly extending upper horizontal portions 174. A spacer rod 176 extends from one transition section 172 to the other and is integral therewith.

Figure 7:
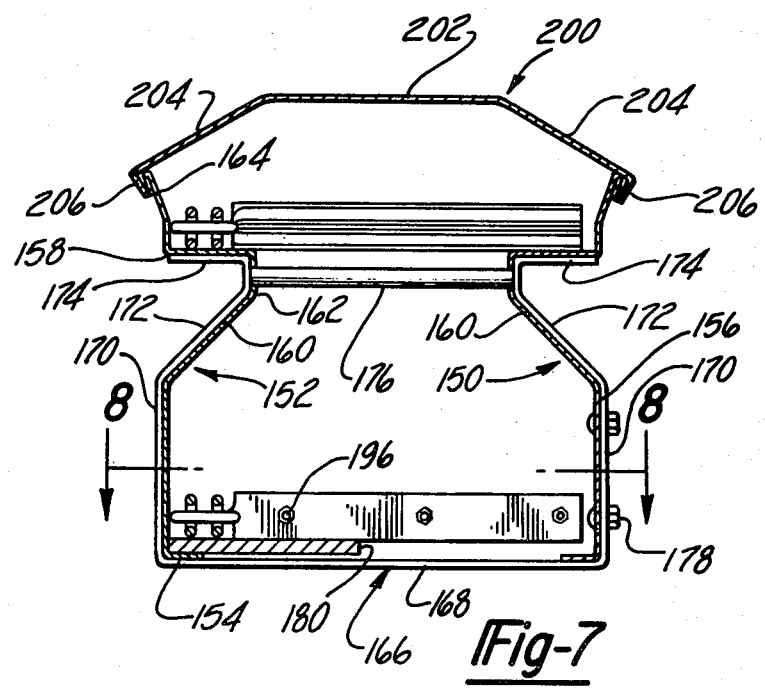
FIG. 7 is an enlarged cross sectional view of the center section of the tapered bed feeder as shown in FIG. 3.
Figure 8:
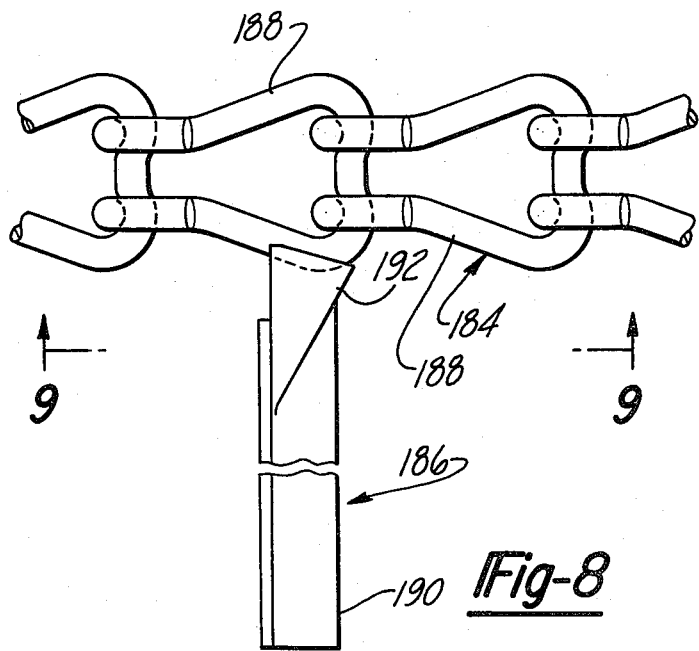
FIG. 8 is an enlarged sectional view of the endless conveyor chain and one conveyor slat taken along lines 8—8 of FIG. 7.
Figure 9:
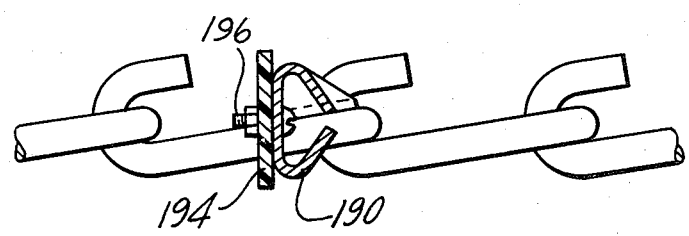
FIG. 9 is a cross sectional view of the endless conveyor chain and one conveyor slat taken along lines 9—9 of FIG. 8.

The ends of side panel members 150 and 152 are positioned on the inside of a spacer bracket assembly 166 as shown in FIG. 7. The inside surfaces of the generally vertical side sections 170 and the upwardly and inwardly extending transition sections 172 are the same shape as the outer surfaces of the side panel members 150 and 152. The side panel members 150 and 152 are secured to the spacer bracket assemblies 166 by bolts 178 or other suitable fastening means such as welding. A notch is provided in the end of each panel section 150 and 152 for a spacer rod 176. The spacer bracket assemblies 166 also connect the idler shaft support 40 and the drive shaft support 44 to the panel members 150 and 152.

The tapered bed 46 is secured to the horizontal tapered bed support ledges 154. The tapered bed 180 can be constructed of wood, metal or other suitable materials. A small hopper 182 is provided at one end of the tapered bed feeder 10. Any suitable conveyor 183 is provided to deposit material such as silage in the small hopper 182. Under the small hopper 182, the tapered bed 46 extends from one side panel member 150 to the other side panel member 152. The width of the tapered bed 46 decreases from the small hopper 182 to the end of the tapered bed feeder 10 remote from the small hopper 182.

An endless conveyor chain 48 is trained around the conveyor sprocket 66 on the idler shaft 64 and the conveyor drive sprocket 134 on the conveyor drive shaft 106. Conveyor slat assemblies 186 are connected to some of links 188 of the endless conveyor chain 48. The conveyor slat assemblies 186 include an elongated portion 190 with a generally triangular cross section. A wear strip 194 is attached to the conveying side of the elongated portion 190 by fasteners 196 to form each conveyor slat assembly 186. On the conveying run the wear strips 194 slide on the tapered bed 46 and push material along the upper surface of the tapered bed 46. On the return run, the wear strips 194 slide on the horizontal endless conveyor chain return run support ledge 158. A support ledge 198 is welded to side wall 70 of the drive shaft support 44 as shown in FIGS. 5 and 6 to support the wear strips 194 after they leave the conveyor slat support 136.

A metal cover 200 as shown in FIG. 7 may be employed to keep rain and snow out of the tapered bed feeder if desired. The metal cover 200 includes elongated sections with a center section 202 downwardly and outwardly inclined side sections 204 and a downwardly and inwardly inclined lip 206 on each edge. The lip 206 engages the outer surfaces of the conveyor cover retaining flanges 164 to hold the metal cover 200 in position. The metal cover 200 can be removed and replaced by deforming its various sections sufficiently to allow the downwardly and inwardly inclined lips 206 to pass over the outer edges of the conveyor cover retaining flanges 164. No tools are required and no fasteners are needed.

The tapered bed feeder 10 is assembled in the field by inserting side panel members 150 and 152 on the inside of the spacer bracket assemblies 166 and inserting bolts 178. Four of the side panels 150 and 152 are bolted to each spacer bracket assembly 166 except for the two ends. The side panels 150 and 152 are normally eight feet long. Some side panels 150 and 152 that are five feet long may also be used so that by using a combination of eight foot and five foot side panel members 150 and 152, the desired overall length for the tapered bed feeder 10 may be constructed. The tapered bed 46 is secured to the horizontal tapered bed support ledges 154. The idler shaft support 40 and the drive shaft support 44, which are normally shipped assembled, are bolted to the ends of the center section 42. The endless conveyor chain 184 with attached conveyor slat assemblies 186 is trained around the conveyor sprocket 66 and the conveyor drive sprocket 134 and the ends are connected. The chains and belts are adjusted. The metal cover 200 is snapped into place and the tapered bed feeder 10 is ready to operate. Obviously, the entire assembly procedure is extremely simple and can be carried out successfully in the field with very simple instructions.

In operation, material such as silage is deposited in the small hopper 182 and on the tapered bed 46. The conveyor slat assemblies 186 push the material along the upper surface of the tapered bed 46. Due to the decreasing width of the tapered bed 46, the material falls off and into the feed bunk 16 from one end of the tapered bed feeder 10 to the other end.

We claim:

1. A tapered bed feeder conveyor including an elongated center section, a tapered bed secured to the center section, an idler shaft rotatably journaled on the idler shaft support, at least one conveyor sprocket secured to the idler shaft, a drive shaft support secured to the other end of the center section, a drive shaft rotatably journaled on the drive shaft support, at least one conveyor sprocket secured to the drive shaft, at least one endless chain trained around the sprockets on the idler shaft and the drive shaft, conveyor slats extending from the endless chain operable to convey material along the upper surface of the tapered bed and a conveyor drive operable to drive the drive shaft characterized by the elongated center section including two reversible and identical side panel members formed from sheet metal with an integral tapered bed support ledge and an integral endless chain return support ledge, each side panel member including upper and lower edges and at least one sloping section intermediate the edges enabling the side panels to nest together while disassembled with one of the side panels turned end for end and corresponding upper and lower edges on adjacent nested panel members being vertically and horizontally offset from each other; and a plurality of spacer bracket assemblies connecting one panel member to the other panel member in a parallel spaced apart relationship.

2. A tapered bed feeder as set forth in claim 1 characterized by the reversible and identical side panel members formed from sheet metal including a conveyor cover retaining flange on their upper edges.

3. A tapered bed feeder as set forth in claim 2 characterized by a cover with lips in engagement with the conveyor cover retaining flanges.

4. A tapered bed feeder as set forth in claim 1 characterized by antifriction material secured to the conveyor slats and in contact with the integral endless chain return support ledge.

5. A tapered bed feeder as set forth in claim 1 characterized by the integral tapered bed support ledge on each side panel being below the integral endless chain return support ledge.

6. A tapered bed feeder as set forth in claim 1 characterized by the elongated center section including at least one spacer bracket assembly with two generally vertical side sections each of which has two side panel members secured thereto.

7. A tapered bed feeder as set forth in claim 6 characterized by the elongated center section including a plurality of spacer bracket assemblies.

8. A tapered bed feeder as set forth in claim 1 wherein said sloping section slopes inwardly and is located adjacent said chain return support ledge of each panel member and extending outwardly.

9. A tapered bed feeder as set forth in claim 8 wherein is provided an outwardly sloping flange above said chain return support ledge forming the upper edge of each panel member to assist in nesting, and a conveyor cover mounted on the flanges during use.

* * * * *